(12) United States Patent
Schneider et al.

(10) Patent No.: US 11,570,604 B2
(45) Date of Patent: Jan. 31, 2023

(54) MODULATION TECHNIQUE FOR NEAR FIELD COMMUNICATION

(71) Applicant: Infineon Technologies AG, Neubiberg (DE)

(72) Inventors: Matthias Schneider, Kirchheim (DE); Yuanfen Zheng, Kirchheim Bei Munich (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 17/217,081

(22) Filed: Mar. 30, 2021

(65) Prior Publication Data

US 2021/0337369 A1 Oct. 28, 2021

(30) Foreign Application Priority Data

Apr. 24, 2020 (EP) ..................................... 20171279

(51) Int. Cl.
*H04W 4/80* (2018.01)
*H04L 27/04* (2006.01)
(52) U.S. Cl.
CPC ............... *H04W 4/80* (2018.02); *H04L 27/04* (2013.01)

(58) Field of Classification Search
CPC ... H04W 4/80; H04W 72/0453; H04W 12/47; H04L 27/04; H04L 1/1867
See application file for complete search history.

(56) References Cited

U.S. PATENT DOCUMENTS

2010/0190436 A1* 7/2010 Cook ..................... H04B 5/00
455/41.1
2018/0167876 A1* 6/2018 Mcfarthing ....... H04L 25/03273

OTHER PUBLICATIONS

European Search Report, EP 201712791, dated Sep. 30, 2020, pp. 1-8.

* cited by examiner

*Primary Examiner* — Tuan H Nguyen
(74) *Attorney, Agent, or Firm* — Armis IP Law, LLC

(57) ABSTRACT

A novel concept for Near Field Communication (NFC) is described herein. In accordance with the embodiments described herein, orthogonal carrier signals are transmitted between NFC transmitter and NFC receiver circuit. In one arrangement, a carrier signal is unmodulated to ensure uninterrupted energy transfer to the receiver circuit. The orthogonal carriers are used to implement full-duplex Near Field Communication.

18 Claims, 6 Drawing Sheets

(a) 16-QAM (b) special 2-QAM für NFC

```
┌─────────────────────────────────────────────────────────┐
│ generate a baseband signal based on a bitstream to be transmitted │──S1
└─────────────────────────────────────────────────────────┘
                              │
                              ▼
┌─────────────────────────────────────────────────────────┐
│ amplitude-modulate a first (in-phase) carrier signal using the baseband signal │──S2
└─────────────────────────────────────────────────────────┘
                              │
                              ▼
┌─────────────────────────────────────────────────────────┐
│ superpose the amplitude-modulated first carrier signal and an unmodulated second (quadrature) carrier signal to obtain an RF signal │──S3
└─────────────────────────────────────────────────────────┘
                              │
                              ▼
┌─────────────────────────────────────────────────────────┐
│ output an analog signal representing the RF signal to an NFC antenna port │──S4
└─────────────────────────────────────────────────────────┘
```

FIG. 7

```
┌─────────────────────────────────────────────────────────┐
│ receive an RF antenna signal, which is a superposition of an amplitude-modulated first (inphase) carrier signal and an unmodulated second (quadrature) carrier signal │──R1
└─────────────────────────────────────────────────────────┘
                              │
                              ▼
┌─────────────────────────────────────────────────────────┐
│ generate a supply voltage from the received RF antenna signal │──R2
└─────────────────────────────────────────────────────────┘
                              │
                              ▼
┌─────────────────────────────────────────────────────────┐
│ demodulate the RF antenna signal to obtain a baseband signal that corresponds to the amplitude-modulated first carrier signal │──R3
└─────────────────────────────────────────────────────────┘
                              │
                              ▼
┌─────────────────────────────────────────────────────────┐
│ generate a bitstream based on the baseband signal │──R4
└─────────────────────────────────────────────────────────┘
```

FIG. 8

```
                                    start
         ┌──────────────────────────┴──────────────────────────┐
         │                                                     │
┌────────┴──────────────────────┐              ┌───────────────┴────────────────┐
│ generate a first (in-phase) baseband signal │  │ receive a second RF signal at the NFC │
│ based on a bitstream to be transmitted      │  │              antenna port              │    U1
│                                             │  │                                        │
└──────────────┬──────────────────────────────┘  └───────────────┬────────────────────────┘
D1             │                                                 │
               ▼                                                 ▼
┌─────────────────────────────────────┐          ┌─────────────────────────────────────────┐
│ amplitude-modulate a first (in-phase) │        │ demodulate the second RF signal using a │
│ carrier signal using the first baseband│       │ second (quadrature) carrier signal to obtain │   U2
│              signal                    │       │ a second (quadrature) baseband signal        │
└──────────────┬──────────────────────┘          └───────────────┬─────────────────────────┘
D1             │                                                 │
               ▼                                                 ▼
┌─────────────────────────────────────┐          ┌─────────────────────────────────────────┐
│ output a first RF signal that represents the │ │ generate a second bitstream based on    │
│ modulated first carrier signal at an NFC     │ │ the second baseband signal              │   U3
│              antenna port                    │ │                                         │
└─────────────────────────────────────┘          └─────────────────────────────────────────┘
D1
```

FIG. 9

MODULATION TECHNIQUE FOR NEAR FIELD COMMUNICATION

TECHNICAL FIELD

Related Application

This application claims priority to earlier filed European Patent Application Serial Number EP20171279 entitled "MODULATION TECHNIQUE FOR NEAR FIELD COMMUNICATION,", filed on Apr. 24, 2020, the entire teachings of which are incorporated herein by this reference.

The present disclosure relates to the field of Near Field Communication (NFC) and particularly to circuits, methods, and devices used in connection with Near Field Communication (NFC).

Background

Near Field Communication (NFC) denotes a standardized data transmission technique for the contactless exchange of data across relatively short distances (e.g. a few centimeters) using electromagnetically coupled inductors. NFC is based on the well-known RFID technique and allows data rates of several hundred kBits/s. Currently NFC is mainly used in the field of "Micropayment" (non-cash payments of small amounts) as well as in the field of access control. Further applications include, for example, the transmission of authentication data in the process of establishing a communication link via, for example, Bluetooth, Wireless LAN or the like. Recently sensor applications have been developed which allow retrieving measured data, e.g. by a mobile device, using NFC. NFC is standardized in ISO/IEC 18092 (Near Field Communication Interface and Protocol-1) and ISO/IEC 21481 (Near Field Communication Interface and Protocol-2).

In order to perform the mentioned payment functions, many mobile devices such as smart phones are equipped with NFC transceivers. Such devices are usually referred to as NFC enabled devices or NFC readers. Their counterparts are often referred to as NFC tags or NFC transponders. NFC transponders usually do not have their own energy supply and source the electrical energy required for their operation from the electromagnetic field used for NFC (NFC field). The NFC field is usually generated by the NFC reader (e.g. a smart phone). That is, energy is transferred via the NFC field from the NFC reader to an NFC transponder, whereas data transmission is possible in both directions. Most of the circuitry of an NFC transponder required to implement Near Field Communication is integrated in a single chip, hereinafter also referred to as NFC chip.

The antennas of NFC readers and NFC chips/transponders are usually simple conductor loops which can be formed, e.g., on a printed circuit board (PCB). In antenna circuits such conductor loops represent respective inductors which form, in connection with corresponding capacitors, resonant circuits. For an efficient energy transfer from an NFC enabled device to an NFC transponder, the corresponding antenna circuits are usually operated at the same resonance frequency, which results in a maximum electromagnetic coupling. As a consequence, the voltage induced in the antenna of the NFC transponder is at its maximum. In standard applications, the resonance frequency is usually at 13.56 MHz. The NFC chip of an NFC transponder is operable to generate its own supply voltage from the NFC field.

As mentioned, NFC, which is basically an RFID technique, was initially designed for applications such as wireless payment and access control in which the transponder can basically be implemented in a single semiconductor chip with no or only very few external circuit components (in addition to the antenna). Further, in such applications the NFC transponders only need to be active during a very short time interval. Accordingly, NFC chips used in common NFC transponders can easily be powered by the energy of the NFC field. However, as NFC is being increasingly used in connection with more complex applications, the power of the NFC field may not suffice to reliably supply the NFC transponder. This may be particularly the case, for example, in sensor applications that include a microcontroller or other circuitry requiring relatively high supply currents, and for which an extra power supply (e.g. a battery) is needed to operate the NFC transponder.

Energy transfer from the NFC reader to the NFC transponder is particularly reduced while the NFC reader is sending data to the NFC transponder, as the amplitude modulation (ASK amplitude shift keying) usually used in NFC reduces the average amplitude of the carrier signal and thus the average power of the NFC field. The degree of amplitude reduction depends on the modulation index. In practice, the modulation index may be as high as 100%, resulting in more or less regular interruptions of the power transfer from the NFC reader to the NFC transponder.

BRIEF DESCRIPTION OF EMBODIMENTS

The inventors have identified a need for improvement of NFC techniques in order to allow an increased energy transfer to the NFC transponder. Furthermore, current NFC techniques only allow a half-duplex data transfer while full-duplex data transfer may be desirable for some applications.

A receiver circuit for Near Field Communication (NFC) is described herein as well as a corresponding transmitter circuit. In accordance with one embodiment, the receiver circuit includes an antenna port operable to receive—from an NFC antenna—an RF signal, which is a superposition of an amplitude-modulated first carrier frequency signal and an unmodulated second carrier frequency signal, wherein the first carrier frequency signal and the second carrier frequency signal are orthogonal to each other. Further, the receiver circuit includes a supply circuit coupled to the antenna port and operable to generate a supply voltage from the received RF signal. Moreover the receiver circuit includes signal processing circuitry operable to demodulate the RF signal to obtain a baseband signal that corresponds to the amplitude-modulated first carrier frequency signal, and to generate a bitstream based on the baseband signal.

A corresponding transmitter circuit includes, in accordance to one embodiment, an antenna port operable to output—to an NFC antenna—an RF signal. Further, the transmitter circuit includes signal processing circuitry operable to generate a baseband signal based on a bitstream to be transmitted; amplitude-modulate a first carrier frequency signal using the baseband signal; and superpose the amplitude-modulated first carrier frequency signal and an unmodulated second carrier frequency signal to obtain a signal representing the RF signal. Thereby, the first carrier frequency signal and the second carrier frequency signal being orthogonal to each other.

Further embodiments relate to corresponding methods for NFC receiver and transmitter circuits. In accordance with one embodiment a method for a receiver circuit includes receiving—from an NFC antenna port—an RF signal, which is a superposition of an amplitude-modulated first carrier frequency signal and an unmodulated second carrier frequency signal, wherein the first carrier frequency signal and the second carrier frequency signal are orthogonal to each other. The method further includes generating a supply voltage from the received RF signal; demodulating the RF signal to obtain a baseband signal that corresponds to the amplitude-modulated first carrier frequency signal; and generating a bitstream based on the baseband signal.

A corresponding method for a transmitter circuit includes, in accordance with one embodiment, generating a baseband signal based on a bitstream to be transmitted and amplitude-modulating a first carrier frequency signal using the baseband signal. The method further includes superposing the amplitude-modulated first carrier frequency signal and an unmodulated second carrier frequency signal to obtain an RF signal, wherein the first carrier frequency signal and the second carrier frequency signal are orthogonal to each other. Moreover, the method includes outputting an analog signal representing the RF signal to an NFC antenna port.

Further embodiments relate to a circuit for full duplex Near Field Communication (NFC) and a corresponding method. In accordance with one embodiment, the circuit includes an antenna port operable to output—to an NFC antenna—a first RF signal and to receive—from the NFC antenna—a second RF signal. The circuit further includes signal processing circuitry operable to generate a first baseband signal based on a bitstream to be transmitted; amplitude-modulate a first carrier frequency signal using the first baseband signal, wherein the first RF signal represents the modulated first carrier frequency signal; demodulate the second RF signal, using a second carrier frequency signal, to obtain a second baseband signal; and generate a second bitstream based on the second baseband signal. Thereby, the first carrier frequency signal and the second carrier frequency signal are orthogonal to each other.

A corresponding method for full duplex Near Field Communication (NFC) includes, in accordance with one embodiment, generating a first baseband signal based on a bitstream to be transmitted; amplitude-modulating a first carrier frequency signal using the first baseband signal; and outputting a first RF signal that represents the modulated first carrier frequency signal at an NFC antenna port. The method further includes receiving a second RF signal at the NFC antenna port; demodulate the second RF signal using a second carrier frequency signal to obtain a second baseband signal; and generate a second bitstream based on the second baseband signal. Also, the first carrier frequency signal and the second carrier frequency signal are orthogonal to each other.

BRIEF DESCRIPTION OF THE DRAWINGS

The invention can be better understood with reference to the following drawings and descriptions. The components in the figures are not necessarily to scale; instead emphasis is placed upon illustrating the principles of the invention. Moreover, in the figures, like reference numerals designate corresponding parts. In the drawings:

FIG. 1 illustrates the coupling of an NFC chip/transponder to an NFC enabled device (NFC reader) such as a smart phone or the like.

FIGS. 7 and 8 are flow charts illustrating corresponding methods for the NFC transmitter and receiver circuits of FIGS. 2 and 3, respectively.

FIG. 9 is a flow chart illustrating one example of a method for full-duplex Near Field Communication performed, e.g. by the transceivers of FIGS. 5 and 6.

DETAILED DESCRIPTION

Figure 1:
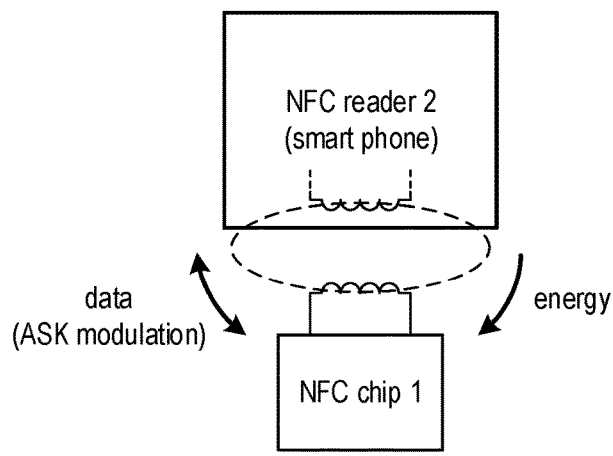

As mentioned above, Near Field Communication (NFC) is a standardized technique for energy and data transmission between an NFC enabled device 2 (NFC reader) such as, for example, a tablet computer, a smart phone or any other mobile device, and an NFC chip 1, which may function as NFC transponder, RFID tag or simply as an NFC communication interface that allows further circuits (e.g. a sensor circuit) to communicate with the NFC reader 2. This situation is illustrated in FIG. 1. Usually, NFC is not only used for (e.g. bidirectional) data transmission but also for the (unidirectional) transmission of energy from the NFC reader 2 to the NFC chip 1. The antennas of the NFC chip 1 and the NFC reader 2 are usually implemented using conductor loops (i.e. flat coils), and the data transmission, as well as the energy transmission, are based on the inductive coupling of the two antennas.

NFC chips may be employed in various applications. Today, NFC is mainly used for authentication, for example, in payment systems or access control systems. Recently, NFC also began to be used in more complex applications such as, for example, sensor applications, to provide a communication link between sensor electronics (e.g. included in the NFC chip 1) and an NFC enabled device, which can then be used for the digital post processing and/or for the display, on a screen of the NFC enabled device (e.g. a smart phone or tablet PC), of the measured data provided by the sensor electronics. Additionally or alternatively, the NFC enabled device 2 can form a "bridge" between the sensor electronics and a host computer connected to the NFC enabled device 2 via, e.g., a local area network or the internet. Further, the NFC enabled device 2 may be used as an input device for the sensor electronics. Accordingly, NFC allows the NFC enabled device to act as human-machine interface for the sensor application.

Applications in which authentication data is to be transmitted by the transponder can basically be implemented with little complexity and such applications require only a comparably low amount of power for operation. Further, the NFC chip (transponder) only needs to be active for a relatively short time. More complex applications such as sensor applications may include electronic circuits that consume more power for longer time periods as compared to normal NFC transponders. In such applications, the NFC transponders may need a separate power supply such as a battery, as the NFC field generated by the NFC reader is not able to transmit enough energy to reliably operate the NFC transponder.

A further problem may arise from the discontinuous transmission of power of the NFC field while an NFC communication is active. According to the relevant standards, amplitude modulation, namely Amplitude Shift Keying (ASK), is used to transmit data from the NFC reader to the NFC transponder. Thus the modulation index depends on the actual implementation, although it may be as high as 100 percent, which means that the carrier frequency signal is blanked when transmitting a "0" symbol. In such a situation, the energy transfer is regularly interrupted (each time a "0" symbol is transmitted), which results in a discontinuous energy transfer while the NFC reader is transmitting and a correspondingly reduced average power transferred to the NFC transponder. Such an intermittent and varying energy transfer makes energy harvesting on the NFC transponder's side difficult, so that many applications need, as mentioned, a separate battery. It is desirable to improve known NFC techniques in order to avoid the need for extra batteries, and to enable NFC readers to ensure a continuous contactless power supply to NFC transponders, even when the latter have a comparably high power consumption.

As discussed above, the intermittent energy flow from NFC reader to NFC transponder chip is a direct result of the modulation technique used to encode data into a carrier frequency signal (ASK is used, as according to the existing standard). One approach to avoiding the discontinuous energy transmission could be to use Frequency Shift Keying (FSK) or Phase Shift Keying (PSK) instead of ASK. However, this would result in an increased complexity of the demodulation in the NFC transponder, and—even more problematic—it would entail changing the modulation technique to FSK or PSK, which would render the NFC transponder chip incompatible with existing NFC readers.

Figure 2:
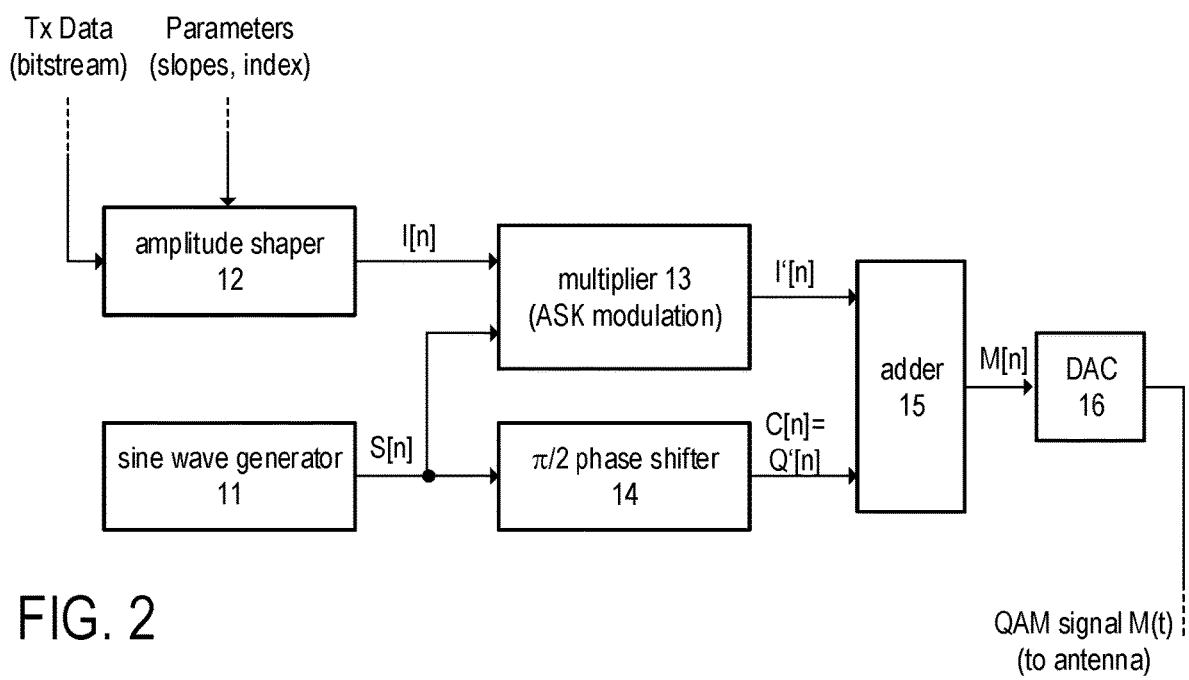
FIG. 2 illustrates one example of an improved transmitter portion of an NFC reader.
Figure 3:
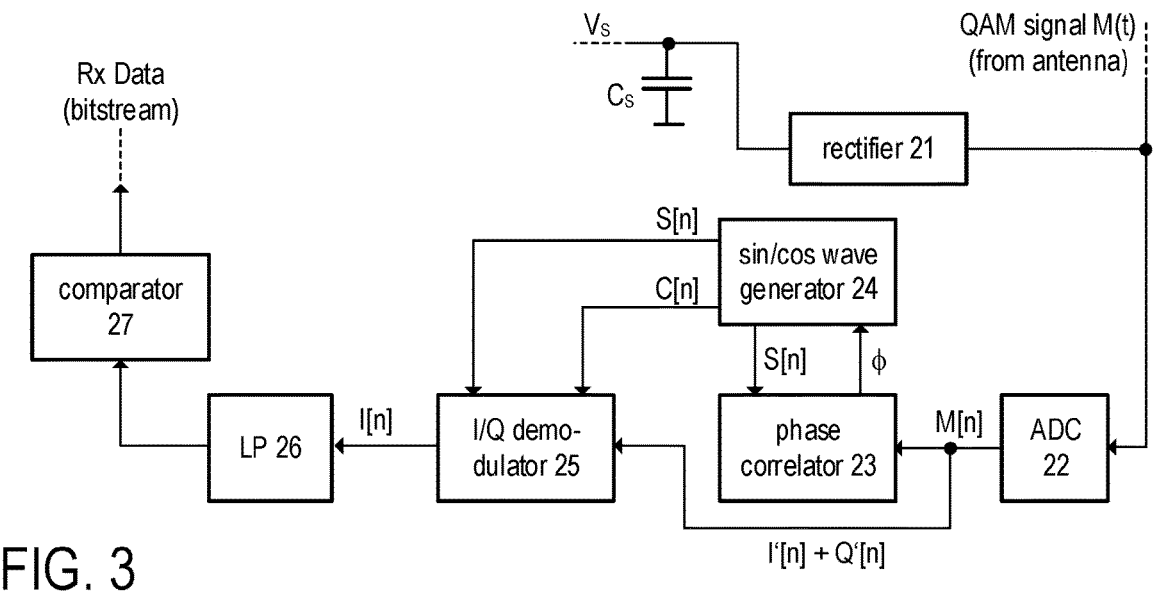
FIG. 3 illustrates one example of the receiver portion of an NFC transponder corresponding to the transmitter of FIG. 2.

The example of FIG. 2 illustrates the transmitter portion of an NFC reader 2, which uses a special case of Quadrature Amplitude Modulation (QAM) in which the data to be transmitted is coded in the in-phase component of the base-band signal while the quadrature component is constant "1". That is, the information to be transmitted is carried by the in-phase carrier frequency wave only while quadrature carrier wave is unmodulated. FIG. 3 illustrates the corresponding receiving portion of an NFC transponder 1. As will become clear in the following description, such an approach allows a continuous, uninterrupted energy transfer from NFC reader to NFC transponder while maintaining backwards compatibility with legacy systems that use ASK.

According to FIG. 2, an NFC reader 2 includes a sine wave generator 11 which is operable to generate a sine signal S[n], referred to hereinafter as in-phase carrier frequency signal. The sine signal S[n] is phase shifted by phase shifter 14, which generates a 90 degree phase shifted version of the sine signal S[n], referred to hereinafter as cosine signal C[n] or quadrature carrier frequency signal. The amplitude shaper 12 generates the in-phase signal I[n] (baseband signal) based on a bit stream that represents the data to be transmitted (denoted as "Tx data" in FIG. 2) and further based on one or more parameters such as a modulation index, slopes of level changes, etc. The actual amplitude modulation is done by the multiplier 13, which is configured to multiply the (in-phase) baseband signal I[n] with the a sine signal S[n] (in-phase carrier frequency signal). The result of the multiplication is the modulated in-phase carrier frequency signal I'[n]. The modulated in-phase carrier frequency signal I'[n] and the unmodulated cosine signal C[n] (unmodulated quadrature carrier frequency signal) are added by adder 13, and the sum signal M[n] can be interpreted as a QAM signal, wherein only the in-phase component is modulated. Generally the in-phase carrier wave and quadrature carrier wave can be regarded as two carrier frequency signals which are orthogonal to each other, wherein the two orthogonal carrier frequency signals are superposed (added) to obtain an RF signal, which is then radiated via the antenna. For the discussion herein, it is sufficient to state that two carrier frequency signals are orthogonal if they are phase shifted by 90° ($\pi/2$ rad) with respect to each other). Beyond this, the concept of orthogonality of signals is a widely known one in the relevant fields.

In the example of FIG. 2, the transmitter is implemented fully digitally and the digital QAM signal M[n] is converted into an analog QAM signal using a digital-to-analog converter 16. The resulting analog signal M(t) may be amplified (amplifier not shown in FIG. 2) and radiated by the antenna of the NFC reader 2. The digital part of the transmitter portion of the NFC reader shown in FIG. 2 may be implemented using hard-wired digital circuitry, a processor executing software instructions or a combination of both. It is noted that, in other embodiments, some or all of the components/function blocks shown in FIG. 2 may be also implemented using analog circuitry. Of course, the digital-to analog converter 16 will then not be needed or will be placed at a different position in the signal processing chain. However, the frequency used for the carrier frequency signals (e.g. 13.56 MHz) will be low enough to allow for an efficient digital implementation as shown in FIG. 2.

The example of FIG. 3 illustrates the receiver portion of an NFC chip 1 of an NFC transponder, which corresponds to the transmitter circuit of the NFC reader shown in FIG. 2. The QAM signal M(t) is received by the transponder's antenna and converted into a digital QAM signal M[n]. The antenna signal may be pre-filtered and pre-amplified before being supplied to the analog-to-digital converter 22. Filters and amplifiers are not relevant for the further discussion and are thus not shown in order to keep the drawings simple. Further, the antenna signal M(t) is rectified (see FIG. 3, rectifier 21), and the rectified output voltage of the rectifier 21 is smoothed and buffered by a capacitor Cs and used as supply voltage Vs for the circuit components of the NFC transponder. The supply circuit formed, inter alia, by rectifier 21 and capacitor Cs is capable of harvesting energy from the NFC field and of generating the supply voltage Vs therefrom. The supply circuit may include further circuit components such as circuitry for voltage regulation (Zener diodes, resistors, etc.). Various options for implementing such supply circuits of NFC transponders are as such known and thus not further discussed here.

At this point it should be noted that—due to the special quadrature amplitude modulation described above (with unmodulated quadrature carrier wave)—the received QAM signal M(t) is a continuous signal and is not interrupted by modulation symbols or modulation pauses. Accordingly, a continuous, uninterrupted energy transfer from the NFC reader 2 to the NFC transponder chip 1 can be ensured irrespective of whether a data transfer is active or not. The maximum power consumption of the NFC transponder can be higher as compared to conventional NFC systems and the supply circuit of the NFC transponder may require a smaller capacitor Cs. Dependent on the application, a separate source of energy for the NFC transponder (e.g. a battery) may be dispensable.

The digitized QAM signal M[n] is used to reconstruct the carrier frequency signals (i.e. sine signal S[n] and cosine signal C[n]). In the present example, the carrier frequency signals S[n] and C[n] are generated by the sine/cosine wave generator 24. The phase correlator 23 is used to determine a phase difference φ between the received QAM signal M[n] and the combined carrier frequency signals S[n]+Q[n], and the determined phase difference is used by the sine/cosine wave generator 24 to adjust/regulate the phase of the carrier frequency signals S[n] and C[n]. That is, the phase correlator 23 is part of a phase control loop. Function and implementation of carrier frequency signal reconstruction is as such known and is thus not further discussed herein.

The digitized QAM signal M[n] (i.e. the sum of modulated in-phase carrier frequency signal I'[n] and unmodulated quadrature carrier frequency signal Q'[n]) is demodulated using the reconstructed sine and cosine signals S[n], C[n] by I/Q demodulator 25. The resulting in-phase signal I[n] (baseband signal) is denoted as I[n], whereas the corresponding quadrature signal Q[n] may be discarded (because the quadrature component Q'[n] of the QAM signal M[n] is unmodulated anyway). A bit stream representing the transmitted data may be obtained by low-pass filtering the baseband in-phase signal I[n] (see FIG. 3, low-pass filter 26) and subsequent threshold detection using comparator 27. The received bit stream is denoted as "Rx data" in FIG. 3.

Similar to the transmitter circuit in FIG. 2, the corresponding receiver circuit of FIG. 3 is mainly implemented digitally, i.e. using hard-wired or programmable digital circuits or a combination thereof. It is understood that at least some digital components could also be replaced by analog circuitry. In this case, the analog-to-digital converter 22 is not needed or is placed at a different position in the signal processing chain.

Figure 4:
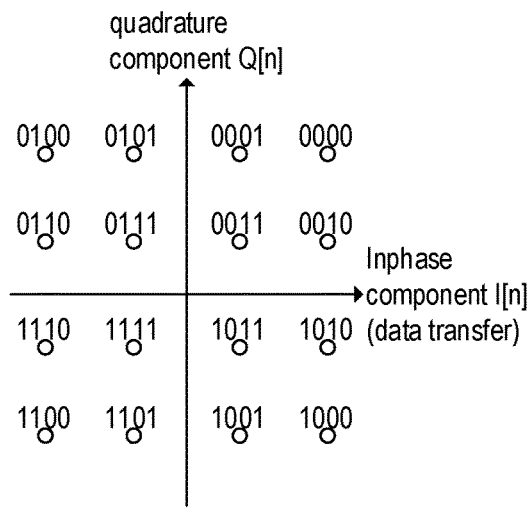
FIG. 4 illustrates constellation diagrams QAM used (a) in a common 16-QAM transmission and (b) in the examples of FIGS. 2 and 3.
Figure 4:
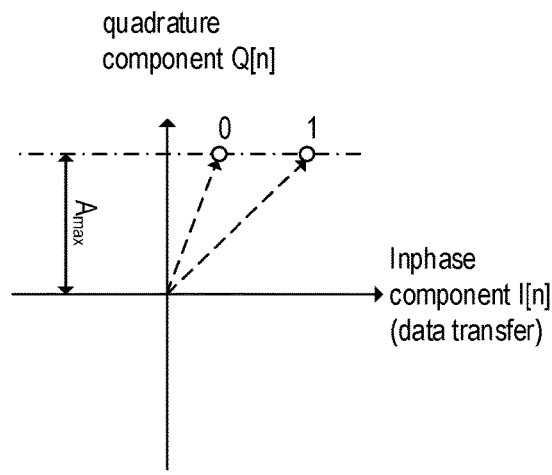

The concepts applied by the embodiments described herein are further illustrated by the constellation diagrams of FIG. 4. Diagram (a) of FIG. 4 illustrates the 16 constellation points (representing 16 different symbols) available in a transmission system using 16-QAM. Each symbol represents a 4-bit word. The special QAM used by the embodiments described above with reference to FIGS. 2 and 3 only uses two constellation points, which lie on a vertical line that represents a constant (unmodulated) amplitude Amax of the quadrature carrier frequency signal (see FIG. 4, diagram (b), dash-dotted line). It is understood that diagram (b) of FIG. 4 is only one illustrative example and the position of the constellation points may be different dependent on the actual implementation. Further, symbols representing two or more bits may also be used (resulting in 4 or more constellation points on the dash-dotted line in the constellation diagram).

The examples of FIGS. 2 and 3 represent the transmitter of the NFC reader and the receiver of the NFC transponder used during downlink communication. Uplink communication may be implemented according to existing NFC standards, wherein the transponder modulates the electric load connected to the transponder antenna, e.g. by shorting the antenna contacts using an electronic switch. The load modulation affects the magnetic coupling between the NFC reader and the NFC transponder, which can be detected by a receiver circuit in the NFC reader. As mentioned, uplink communication may be implemented in accordance with existing standards and is thus not further described herein.

It is understood that several modifications may be made to the embodiments described herein to obtain further embodiments. As mentioned, digital circuitry may, at least in parts, be replaced by analog circuitry, the roles of in-phase and quadrature signals may be interchanged (i.e. quadrature carrier wave is amplitude modulated and in-phase carrier ware remains unmodulated), and the carrier signal reconstruction (clock reconstruction) may be implemented in different ways, etc. No such modification would significantly change the functionality or the effects of the components used in the embodiments described above.

Enhancing Near Field Communication by using in-phase and quadrature carrier wave allows for full-duplex communication between an NFC reader and an NFC transponder. Below, the physical layer—layer 1 according to the Open Systems Interconnection (OSI) model—is described with reference to the examples shown in FIGS. 5 and 6.

Figure 5:
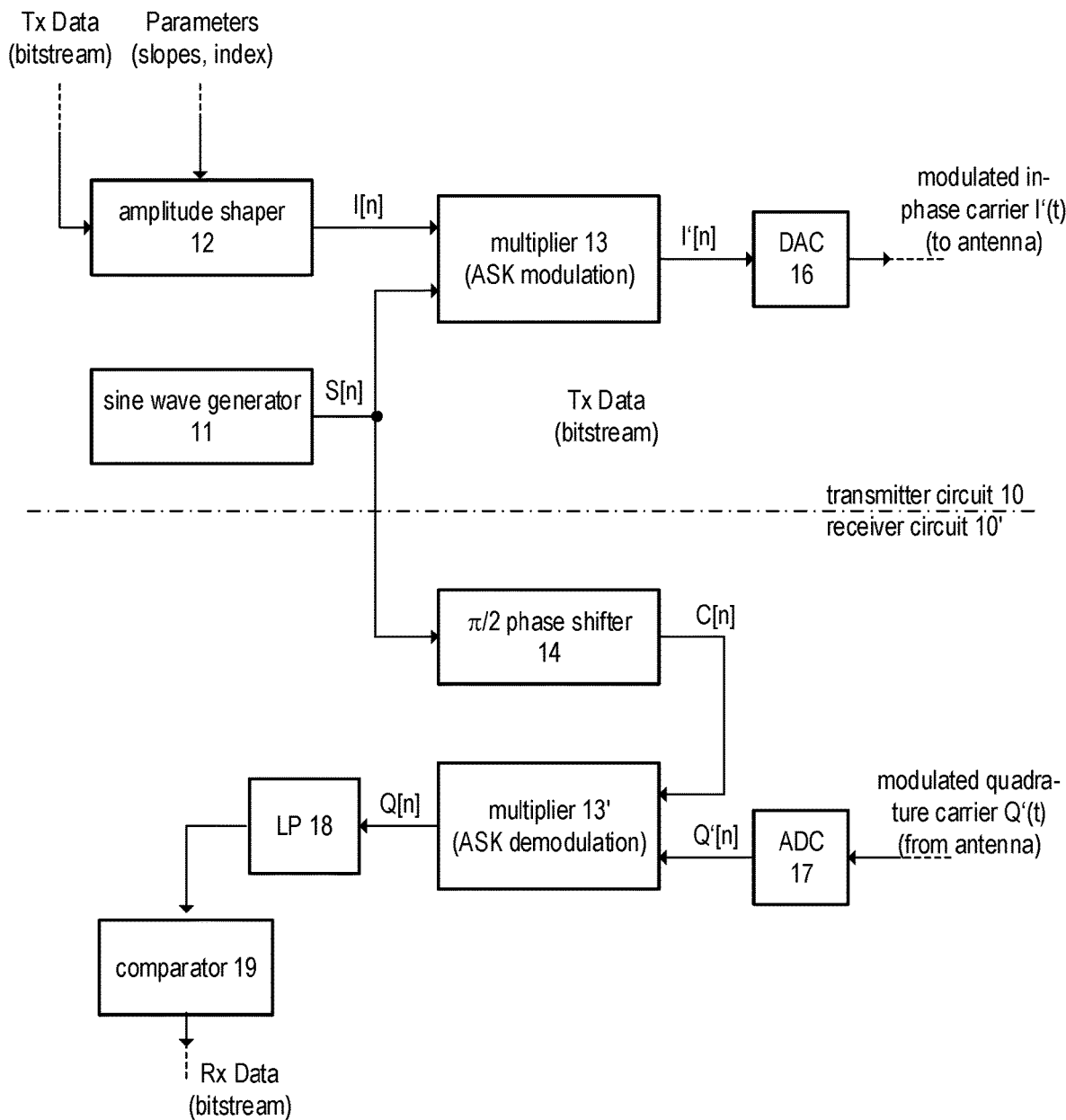
FIG. 5 illustrates one example of a transceiver of an NFC reader which allows for full duplex communication.

FIG. 5 illustrates the transmitter and receiver portions of an NFC reader, which is also referred to as an "initiator" because it initiates the communication with an NFC transponder, also referred to as a "pairing partner". In the examples discussed below, the in-phase carrier wave is used for downlink communication (initiator to pairing partner), and the quadrature carrier wave is used for uplink communication (pairing partner to initiator). In the example of FIG. 5, the transmitter circuit 10 of the initiator includes sine ware generator 11, the amplitude shaper 12 and the multiplier 13 (ASK modulator), which function substantially in the same way as in the example of FIG. 2

The sine wave generator 11 is configured to generate a sine signal S[n], which is referred to as in-phase carrier wave. The amplitude shaper 12 generates the in-phase signal I[n] (baseband signal) based on an input bit stream that represents the data to be transmitted (denoted as "Tx data" in FIG. 5) and further based on one or more parameters such as a modulation index, slopes of level changes, etc. The actual amplitude modulation is done by the multiplier 13, which is configured to multiply the (in-phase) baseband signal I[n] with the a sine signal S[n] (in-phase carrier wave). The result of the multiplication is the modulated in-phase carrier wave I'[n]. This modulated in-phase carrier wave I'[n] is then converted into an analog signal (see FIG. 5, digital-to-analog converter 16), amplified (optional, amplifier not shown) and radiated by the NFC antenna. Different from the example of FIG. 2, the cosine signal C[n] is not added in order to generate a QAM signal. Instead, the cosine signal, which is provided by the phase shifter 14, is used to demodulate the received quadrature carrier wave Q'[n].

The receiver circuit 10' of the initiator includes the mentioned phase shifter 14, which is configured to generate the cosine signal C[n] by subjecting the sine signal to a 90° phase shift. The receiver circuit 10' further includes an analog-to-digital converter 17, which is configured to digitize the modulated quadrature carrier wave received from the NFC antenna. The antenna signal may optionally be pre-amplified and filtered before the analog-to-digital conversion (amplifiers and analog filters are not shown in the figures). The digital modulated quadrature carrier signal Q'[n] is demodulated by means of multiplication with the cosine signal C[n]. The demodulated quadrature signal is low-pass filtered (see FIG. 5, low-pass 18) and the received bit-stream "Rx data" is obtained using a comparator 19 configured to compare the output signal of the filter 18 with a preset threshold value. The receiving circuit is very similar to the receiving circuit shown in FIG. 3. However, a carrier frequency signal reconstruction is not necessary on the initiator's side and, further, a simple ASK demodulation is used instead of an I/Q demodulation.

It is noted that the transmitter circuit 10 is compatible with existing NFC standards as a standard ASK modulation is used. However, the uplink communication is performed using the quadrature carrier wave (generated by the pairing partner), which allows a simultaneous (full-duplex) communication in both directions. In addition to the receiver circuit 10' and in order to ensure backwards compatibility, the initiator may include an additional standard receiver that operates in accordance with the existing NFC standards (i.e. using load modulation as mentioned further above).

Figure 6:
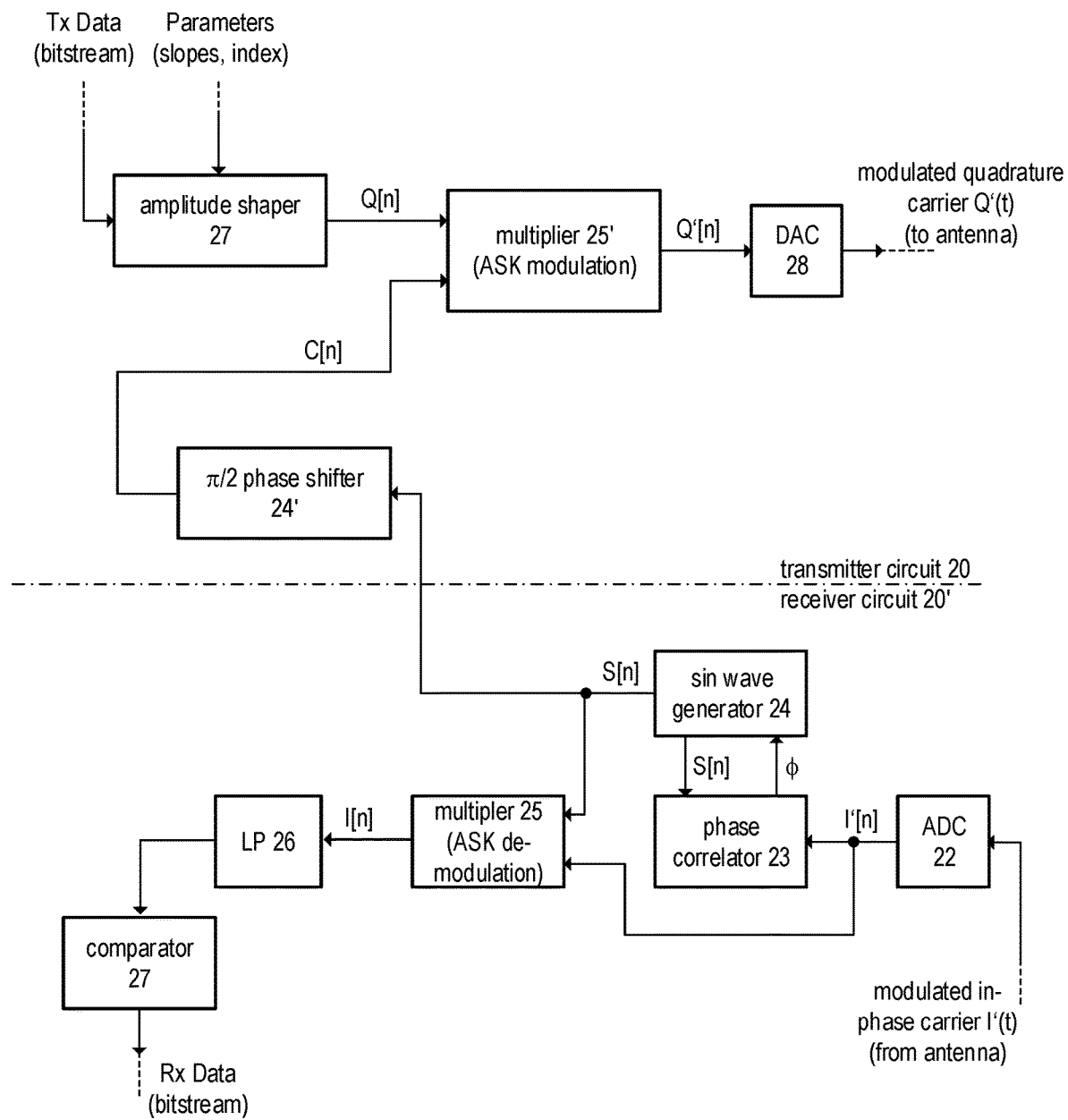
FIG. 6 illustrates one example of a transceiver of an NFC transponder which allows for full duplex communication with the NFC reader of FIG. 5.

FIG. 6 illustrates an exemplary implementation of transmitter circuit 20 and receiver circuit 20' of the pairing partner (NFC transponder) which acts as counterpart of the initiator (NFC reader) of FIG. 5. It is noted that, for full duplex communication, the pairing partner/NFC transponder will in most cases need a separate power supply such as a battery, as the initiator/NFC reader does not transmit an uninterrupted and unmodulated (quadrature) carrier wave as in the previous examples of FIGS. 2 and 3.

According to FIG. 6, the modulated in phase carrier wave I'(t) is received by the NFC antenna of the pairing partner and digitized using the analog-to-digital converter 22. The resulting digital modulated in-phase carrier frequency signal is denoted as I'[n] and is used for carrier frequency reconstruction, which is basically done the same way as in the example of FIG. 3. The sine wave generator 24 generates the sine signal S[n] (in-phase carrier frequency signal), which is correlated (see FIG. 6, phase correlator 23) with the received modulated in-phase carrier frequency signal I'[n] in order to determine a potential phase difference φ. The determined phase difference φ is fed back to the sine wave generator 24, which allows the sine wave generator 24 to regulate the phase of the sine signal S[n]. Basically, sine wave generator 24 and the phase correlator 23 form a closed phase control loop. Carrier frequency reconstruction is as such known and thus not explained here in further detail.

The sine signal S[n] (reconstructed carrier signal) is used to demodulate the modulated in-phase carrier signal I'[n] (see FIG. 6, ASK demodulator 25). The ASK demodulator 25 is basically a digital multiplier. The resulting in-phase signal I[n] (baseband signal) is low-pass filtered (see FIG. 6, low pass 26), and the bitstream is obtained using comparator 27, similar to the example of FIG. 3. The received bitstream is denoted as "Rx data".

In the transmitter portion 20 of the pairing partner, a cosine signal C[n] is needed to modulate the baseband signal Q[n]. Again a phase shifter 24' is used to generate the cosine signal C[n] based on the sine signal S[n] provided by the sine wave generator 24. The amplitude shaper 27, multiplier 25' and digital-to-analog converter 28 function basically in the same way as in the example of FIG. 5 (cf. FIG. 5, amplitude shaper 12, multiplier 13, digital-to-analog converter 16) and reference is also made to the description above. In this case, however, the cosine signal C[n] is used on the pairing partner's side as (quadrature) carrier wave and the respective modulated carrier wave is orthogonal to the modulated carrier wave transmitted by the initiator.

The systems initiator—paring partner illustrated in FIGS. 5 and 6 may be implemented using mainly hard-wired and/or programmable digital circuitry. The analog frontends between antenna and analog-to-digital converter and between digital-to analog-converter and antenna basically include amplifiers and matching circuitry which is as such known and also present in existing NFC systems. Duplex communication is implemented using the in-phase carrier wave for downlink communication and the corresponding quadrature carrier wave for uplink communication (or vice versa). As mentioned, the circuit diagrams of FIGS. 5 and 6 illustrate the physical layer of the OSI model. The higher layers (data link layer, network layer, transport layer, etc.) may be implemented using any known techniques. For example, a frame based communication may be implemented based on the physical layer such as, for example, UART frames, Ethernet frames or the like. Communication protocols such as IP (Internet Protocol) or the like may be implemented using a frame based communication such as Ethernet.

Corresponding methods, which may be performed, for example, by the NFC transmitter and receiver circuits of FIGS. 2 and 3, respectively, are summarized below with reference to the flow charts of FIGS. 7 and 8. It is understood that the following is not an exhaustive enumeration of technical features but rather an exemplary summary FIG. 7 illustrates one embodiment of a method which may be performed by an NFC transmitter circuit. Accordingly, the method includes generating a baseband signal based on a bitstream to be transmitted (see FIG. 7, step S1), amplitude-modulating a first carrier signal (see FIG. 2, in-phase carrier signal S[n]) using the baseband signal (see FIG. 7, step S2); and superposing the amplitude-modulated first carrier signal (see FIG. 2, modulated in-phase carrier signal I'[n]) and an unmodulated second (quadrature) carrier signal (see FIG. 2, signals C[n]=Q'[n]) to obtain an RF signal (see FIG. 7, step S3). The first (in-phase) carrier signal and the second (quadrature) carrier signal are orthogonal to each other. The method further includes outputting an analog signal (cf. FIG. 2, QAM signal M(t)), which represents the RF signal, to an NFC antenna port (see FIG. 7, step S4). In this embodiment, the quadrature carrier signal does not carry information and is basically used to ensure energy transfer to the receiver. It is understood that, in all embodiments described herein, in-phase and quadrature components can interchange roles.

FIG. 8 illustrates one embodiment of a method which may be performed by an NFC receiver circuit. Accordingly, the method includes receiving—from an NFC antenna port (which is coupled to a respective antenna during operation—an RF antenna signal (cf. FIG. 3, QAM signal M(t)), which is a superposition of an amplitude-modulated first carrier signal I'(t) and an unmodulated second carrier signal Q'(t) (see FIG. 8, step R1). The first carrier signal I'(t) and the second carrier signal Q'(t) are orthogonal to each other and usually referred to as in-phase and quadrature carrier signals. The method further includes generating a supply voltage (cf. FIG. 3, voltage Vs) from the received RF antenna signal (see FIG. 8, step R2) and demodulating the RF antenna signal to obtain a baseband signal (cf. FIG. 3, baseband in-phase signal I[n]) that corresponds to the amplitude-modulated first carrier signal (see FIG. 8, step R3). Further, the method includes generating a bitstream based on the baseband signal (see FIG. 8, step R4). In this context, it is noted that only the in-phase carrier signal is demodulated as the quadrature carrier signal does not contain information anyway (or vice versa dependent on whether the first or the second carrier signal is regarded as in-phase signal).

The generated supply voltage may be used in the receiver circuit to supply circuit components used to demodulate the RF antenna signal and to generate the bitstream as well as to supply further circuit components which are, for example, used to digitally process the bitstream (e.g. a microcontroller).

In the following the embodiments shown in FIGS. 5 and 6 are summarized, which show a two corresponding circuits capable of full-duplex Near Field Communication. Again, it is emphasized that this is merely an exemplary summary and not an exhaustive list of technical features. Due to some symmetry between initiator and pairing partner, the following applies to both, initiator and pairing partner. Accordingly, a circuit for full-duplex Near Field Communication (NFC) includes an antenna port configured to output—to an NFC antenna—a first RF signal and to receive—from the NFC antenna—a second RF signal. The circuit further includes signal processing circuitry configured to: generate a first baseband signal based on a bitstream to be transmitted; to amplitude-modulate a first carrier signal using the first baseband signal, wherein the first RF signal represents the modulated first carrier signal; to demodulate the second RF signal using a second carrier signal to obtain a second baseband signal; and to generate a second bitstream based on the second baseband signal. Thereby the first carrier signal and the second carrier signal are orthogonal to each other.

In case the circuit is part of an initiator device (cf. FIG. 5), the first RF signal is the modulated in-phase carrier signal I' (t) transmitted to the pairing partner (downlink) and the second RF signal is the modulated quadrature carrier signal Q' (t) received from the pairing partner (uplink). Similarly, the first baseband signal carries the information (coded into the first bistream) to be sent to the pairing partner and the second baseband signal carries the information received from the pairing partner (and provided as second bistream).

In case the circuit is part of a pairing partner device (cf. FIG. 6) the first RF signal is the modulated quadrature carrier signal Q' (t) transmitted to the initiator (uplink) and the second RF signal is the modulated in-phase carrier signal I'(t) received from the initiator (downlink). Similarly, the first baseband signal carries the information (coded into the first bistream) to be sent to the initiator and the second baseband signal carries the information received from the initiator (and provided as second bistream). In both, the initiator and the pairing partner, the first and the second carrier signals are orthogonal to each other, wherein a carrier reconstruction is only needed in the pairing partner (see FIG. 6). In all embodiments, orthogonality between corresponding in-phase and quadrature carriers is accomplished using 90° (7c/2 rad) phase shifters.

FIG. 9 is a flow chart illustrating one example of a method for full-duplex Near Field Communication performed, e.g. by the transceivers of FIGS. 5 and 6, wherein the steps shown in the uplink and in the downlink paths may be performed simultaneously. Accordingly, the method includes generating a first baseband signal based on a bitstream to be transmitted (see FIG. 9, step D1); amplitude-modulating a first carrier signal using the first baseband signal (see FIG. 9, step D2); and outputting a first RF signal that represents the modulated first carrier signal at an NFC antenna port (see FIG. 9, step D3). The method further includes receiving a second RF signal at the NFC antenna port (see FIG. 9, step U1); demodulating the second RF signal using a second carrier signal to obtain a second baseband signal (see FIG. 9, step U2); and generating a second bitstream based on the second baseband signal (see FIG. 9, step U3). Thereby the first carrier signal and the second carrier signal are orthogonal to each other.

In case of an intiator device, the steps D1, D2, and D3 refer to the downlink path and the steps U1, U2, and U3 refer to the uplink path. Conversely, in case of a pairing device, the steps D1, D2, and D3 refer to the uplink path and the steps U1, U2, and U3 refer to the downlink path.

While various embodiments of the invention have been described, it will be apparent to those of ordinary skill in the art that many more embodiments and implementations are possible within the scope of the invention. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

The invention claimed is:

1. A transmitter circuit for Near Field Communication (NFC), the transmitter circuit comprising:
  signal processing circuitry operable to: i) generate a baseband signal (I[n]) based on a bitstream to be transmitted; ii) using the baseband signal (I[n]), amplitude-modulate a first carrier signal (S[n]) into an amplitude-modulated first carrier signal (I'[n]); iii) via an adder, superpose the amplitude-modulated first carrier signal (I'[n]) and an unmodulated second carrier signal (C[n]; Q'[n]) to obtain a digital signal M[n], the first carrier signal (S[n]) and the unmodulated second carrier signal (C[n]; Q'[n]) being orthogonal to each other; iv) generate an RF signal (M(t)) from the digital signal M[n]; and
  an antenna port operable to output, to an NFC antenna, the RF signal (M(t)).

2. The transmitter circuit of claim 1, wherein the signal processing circuitry includes:
  a digital-to-analog-converter operative to convert the digital signal M[n] into the RF signal (M(t)).

3. The transmitter circuit of claim 2, wherein, to generate the baseband signal (I[n]), the signal processing circuitry includes an amplitude shaper that is operable to generate the baseband signal (I[n]) based on the bit stream and further based on one or more signal parameters.

4. The transmitter circuit of claim 3, wherein, to amplitude-modulate the first carrier signal (S[n]), the signal processing circuitry includes a sine wave generator operable to produce the first carrier signal (S[n]); and
  wherein the signal processing circuitry includes a multiplier operable to multiply the first carrier signal (S[n]) and the baseband signal (I[n]) to produce the amplitude-modulated first carrier signal (I[n]).

5. The transmitter circuit of claim 4, wherein the signal processing circuitry includes a phase shifter operable to produce the unmodulated second carrier signal (C[n]; Q'[n]) via phase shifting of the first carrier signal (S[n]).

6. The transmitter circuit of claim 1, wherein, to superpose the amplitude-modulated first carrier signal (I'[n]) and the unmodulated second carrier signal (C[n]; Q'[n]), the signal processing circuitry includes the adder operable to add the amplitude-modulated first carrier signal (I'[n]) and the unmodulated second carrier signal (C[n]; Q'[n]) to produce the digital signal M[n].

7. The transmitter circuit of claim 1, wherein the signal processing circuitry includes a phase shifter operable to produce the unmodulated second carrier signal (C[n]; Q'[n]) via phase shifting of the first carrier signal (S[n]).

8. The transmitter circuit of claim 1, wherein the RF signal (M(t)) is a QAM (Quadrature Amplitude Modulation) signal.

9. The transmitter circuit as in claim 1, wherein the RF signal (M(t)) provides a continuous, uninterrupted energy transfer from the transmitter circuit to a receiver circuit.

10. The transmitter circuit as in claim 1, wherein the unmodulated second carrier signal (C[n]; Q'[n]) is 90 degree phase shifted with respect to the first carrier signal (S[n]).

11. The transmitter circuit as in claim 1, wherein the first carrier signal is a sine wave; and wherein the unmodulated second carrier signal is a cosine wave.

12. The transmitter circuit as in claim 1, wherein the second carrier signal is unmodulated.

13. A method for an NFC transmitter comprising:
generating a baseband signal (I[n]) based on a bitstream to be transmitted;
via the baseband sign (I'[n]), amplitude-modulating a first carrier signal (S[n]) into an amplitude-modulated first carrier signal (I'[n]);
superposing the amplitude-modulated first carrier signal (I'[n]) and an unmodulated second carrier signal (C[n]; Q'[n]) to obtain a digital signal (M[n]), the first carrier signal (S[n]) and the unmodulated second carrier signal (C[n]; Q'[n]) being orthogonal to each other; and
outputting an analog signal (M(t)) to an NFC antenna port, the analog signal (M(t)) representing the digital signal (M[n]).

14. A transmitter circuit for Near Field Communication (NFC), the transmitter circuit comprising:
signal processing circuitry operable to: i) generate a baseband signal based on a bitstream of data; ii) using the baseband signal, amplitude-modulate a first carrier signal into an amplitude-modulated first carrier signal; iii) via an adder, superpose the amplitude-modulated first carrier signal and a second carrier signal to produce a digital signal, the second carrier signal being phase shifted with respect to the first carrier signal; iv) generate an RF signal from the digital signal; and
an antenna port operable to output, to an NFC antenna, the RF signal.

15. The transmitter circuit as in claim 14 further comprising:
a phase shifter operative to: i) receive the first carrier signal, and ii) phase shift the first carrier signal to produce the second carrier signal.

16. The transmitter circuit as in claim 14, wherein the second carrier signal is 90 degree phase shifted with respect to the first carrier signal.

17. The transmitter circuit as in claim 14, wherein the first carrier signal is a sine wave;
wherein the second carrier signal is a cosine wave.

18. The transmitter circuit as in claim 14, wherein the RF signal provides a continuous, uninterrupted energy transfer from the transmitter circuit to a receiver circuit.

* * * * *

UNITED STATES PATENT AND TRADEMARK OFFICE
CERTIFICATE OF CORRECTION

PATENT NO. : 11,570,604 B2
APPLICATION NO. : 17/217081
DATED : January 31, 2023
INVENTOR(S) : Matthias Schneider and Yuanfen Zheng It is certified that error appears in the above-identified patent and that said Letters Patent is hereby corrected as shown below:

In the Claims

Claim 4, Line 8, replace "l[n]" with --l'[n]--

Claim 13, Line 4, replace "sign (l'[n])" with --signal (l[n])--

Signed and Sealed this
Twenty-eighth Day of March, 2023

Katherine Kelly Vidal
*Director of the United States Patent and Trademark Office*